US009179393B2

(12) United States Patent
Hubbell et al.

(10) Patent No.: US 9,179,393 B2
(45) Date of Patent: Nov. 3, 2015

(54) INTELLIGENT COMMUNICATION MOBILE TRANSPONDER

(71) Applicant: Raytheon Company, Waltham, MA (US)

(72) Inventors: Wesley H. Hubbell, St. Petersburg, FL (US); John L. Anderson, Greenville, TX (US)

(73) Assignee: Raytheon Company, Waltham, MA (US)

( * ) Notice: Subject to any disclaimer, the term of this patent is extended or adjusted under 35 U.S.C. 154(b) by 36 days.

(21) Appl. No.: 14/263,469

(22) Filed: Apr. 28, 2014

(65) Prior Publication Data

US 2014/0323038 A1    Oct. 30, 2014

Related U.S. Application Data

(60) Provisional application No. 61/817,086, filed on Apr. 29, 2013.

(51) Int. Cl.
*H04B 7/15* (2006.01)
*H04W 40/20* (2009.01)
*H04B 7/185* (2006.01)

(52) U.S. Cl.
CPC ............. *H04W 40/20* (2013.01); *Y02B 60/50* (2013.01)

(58) Field of Classification Search
CPC ........... H04B 7/18545; H04B 7/18547; H04B 7/1855
USPC .................... 455/10, 11.1; 701/469, 472
See application file for complete search history.

(56) References Cited

U.S. PATENT DOCUMENTS

2011/0004368 A1   1/2011  Hubbell et al.
2014/0142787 A1*  5/2014  Tillotson et al. ............ 701/3

OTHER PUBLICATIONS

Alexander, "Military Embraces Robots with Greater Autonomy", http://www.msnbc.msn.com/id/47356713/ns/technology_and_science-innovation/, May 9, 2012, pp. 1-6.
Brewin, "It's a bird, it's a plane . . . No, it's a radio relay balloon", http://www.nextgov.com/defense/2012/07/its-bird-its-plane-no-its-radio-relay-balloon/57058/, Jul. 27, 2012, pp. 1-2.
Freedberg, "Drones Need Secure Datalinks to Survive Vs. Iran, China", http://breakingdefense.com/2012/08/drones-need-secure-datalinks-to-survive-vs-iran-china/, Aug. 10, 2012, pp. 1-4.
Government Computer News, "UAV's form communication grid above enemy territory", http://gcn.com/microsites/2012/snapshot-c4isr/04-uav-uas-music-dod-army-tactical-networks.aspx, pp. 1-3.
Pasztor et al., "Drone Use Takes Off on the Home Front", Wall Street Journal, Apr. 19, 2012, pp. 1-2.
RF Industries Pty Ltd., "Military UHF Tactical Airborne Transponder", 2009, pp. 1-8.

* cited by examiner

*Primary Examiner* — Lee Nguyen
(74) *Attorney, Agent, or Firm* — David G. Miranda (57) ABSTRACT

An intelligent mobile transponder determines an optimal position to relay signals with respect to multiple users based on a comparison of the signal characteristics of all the users. An intelligent transponder communication system includes a first communication module to transmit a first communication signal at a first direction. The first communication signal has at least one first signal characteristic. A second communication module is configured to transmit a second communication signal at a second direction. The second communication signal has at least one second signal characteristic different from the at least one first signal characteristic. The intelligent mobile transponder is further configured to automatically self-locate to the optimal position to relay the communication signals between the multiple users.

20 Claims, 6 Drawing Sheets

INTELLIGENT COMMUNICATION MOBILE TRANSPONDER

CROSS-REFERENCE TO RELATED APPLICATION

This application is a non-provisional application of U.S. Provisional Patent Application Ser. No. 61/817,086, filed Apr. 29, 2013, the disclosure of which is incorporated by reference herein in its entirety.

BACKGROUND

The present disclosure relates generally to RF communication, and more particularly, an intelligent mobile transponder to enhance RF communication.

Satellite transponders for military and/or commercial use are oversubscribed and expensive to put in place and maintain. Current RF transponders lack intelligence. Users of low power transmitters must therefore communicate with non-intelligent transponders that cannot move.

SUMMARY

An intelligent mobile transponder communication system comprises an intelligent mobile transponder. The intelligent mobile transponder communications module includes a communications module, a navigation module and a control module on board a controllable mobile vehicle. The intelligent mobile transponder is configured to relay communication signals between multiple devices using multiple frequency bands (e.g., uplink and downlink frequency bands). The frequency bands can be communicated along many communications channels. The intelligent mobile transponder receives on the uplink channel and transmits on the downlink channel, for example. Communication devices such as a radio, for example, can transmit data to the intelligent mobile transponder via the uplink channel, and receive data from the intelligent mobile transponder via the downlink channel. The communications module examines the signals being received and reports their characteristics to the control module. Typical characteristics include, but are not limited to, signal power and phase shift. The control module determines the optimal position to relay one or more of the signals based on all the valid signals being received and notifies the navigation module of the optimal position. The navigation module determines if the vehicle can move to the optimal position and will either move the vehicle to that location or to a location within prescribed travel limits that is close to the optimal position.

According to an embodiment, an intelligent mobile transponder is configured to receive a first communication signal from at least one first communication module and a second communication signal from at least one second communication module. The at least one first communication module transmits the first communication signal in a first plurality of directions and has at least one first signal characteristic. The at least one second communication module transmits a second communication signal in a second plurality of directions and has at least one second signal characteristic different from the at least one first signal characteristic. The intelligent mobile transponder is configured to determine an optimal position with respect to the first and second directions based on a comparison between the at least one first signal characteristic and the at least one second signal characteristic. The intelligent mobile transponder further automatically self-locates to the optimal position to relay the first and second communication signals to the at least one first communication module and the at least one second communication module.

According to another exemplary embodiment, a transponder module included in an intelligent mobile transponder comprises a communication module, a signal characteristic processing module, and a control module. The communication module is configured to receive a first incoming communication signal from at least one first communication module and a second incoming communication signal from at least one second communication module. The signal characteristic processing module is in electrical communication with the communication module, and is configured to determine a first primary direction of the first incoming communication signal and a second primary direction of the second incoming communication signal. The communication module is further configured to determine at least one first signal characteristic of the first incoming communication signal and at least one second signal characteristic of the second incoming communication signal. The control module is in electrical communication with the signal characteristic processing module, and is configured to determine an optimal position of the intelligent mobile transponder for relaying the received communication signals based on the first and second primary directions and the at least one first and second signal characteristics. Since transponders typically have multiple communications channels, the case may be extended to multiple transmitters in that the intelligent mobile transponder will determine the location or flight area that best serves all the signals.

According to another exemplary embodiment, a method of relaying communication signals via an intelligent mobile transponder comprises receiving from at least one first communication module a first incoming communication signal having at least one first signal characteristic received from at least one first direction, and receiving from at least one second communication module a second incoming communication signal having at least one second signal characteristic received from at least one second direction that is different from the first direction. The method further includes determining an optimal position with respect to the first and second directions based on a comparison between the at least one first signal characteristic and the at least one second signal characteristic. The method further includes automatically locating the intelligent mobile transponder to the optimal position to relay the first and second communication signals to the at least one first communication module and the at least one second communication module.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature(s) being described. Also, the description is not to be considered as limiting the scope of the embodiments described herein.

Exemplary embodiments are described for providing an intelligent mobile transponder that receives a plurality of communication signals generated by respective communication modules. The intelligent mobile transponder determines a direction of one or more communication signals generated by a plurality of communication modules and one or more signal characteristics of each communication signal. An optimal location for transponding and/or relaying one or more of the communication signals between a plurality of communication modules is determined by the intelligent mobile transponder based on the signal characteristics and the direction of the signals. The intelligent mobile transponder is further configured to automatically adjust a traversed route, such as a travelling path, and self-locate to the optimal location to enhance communications between the communication modules.

Figure 1:
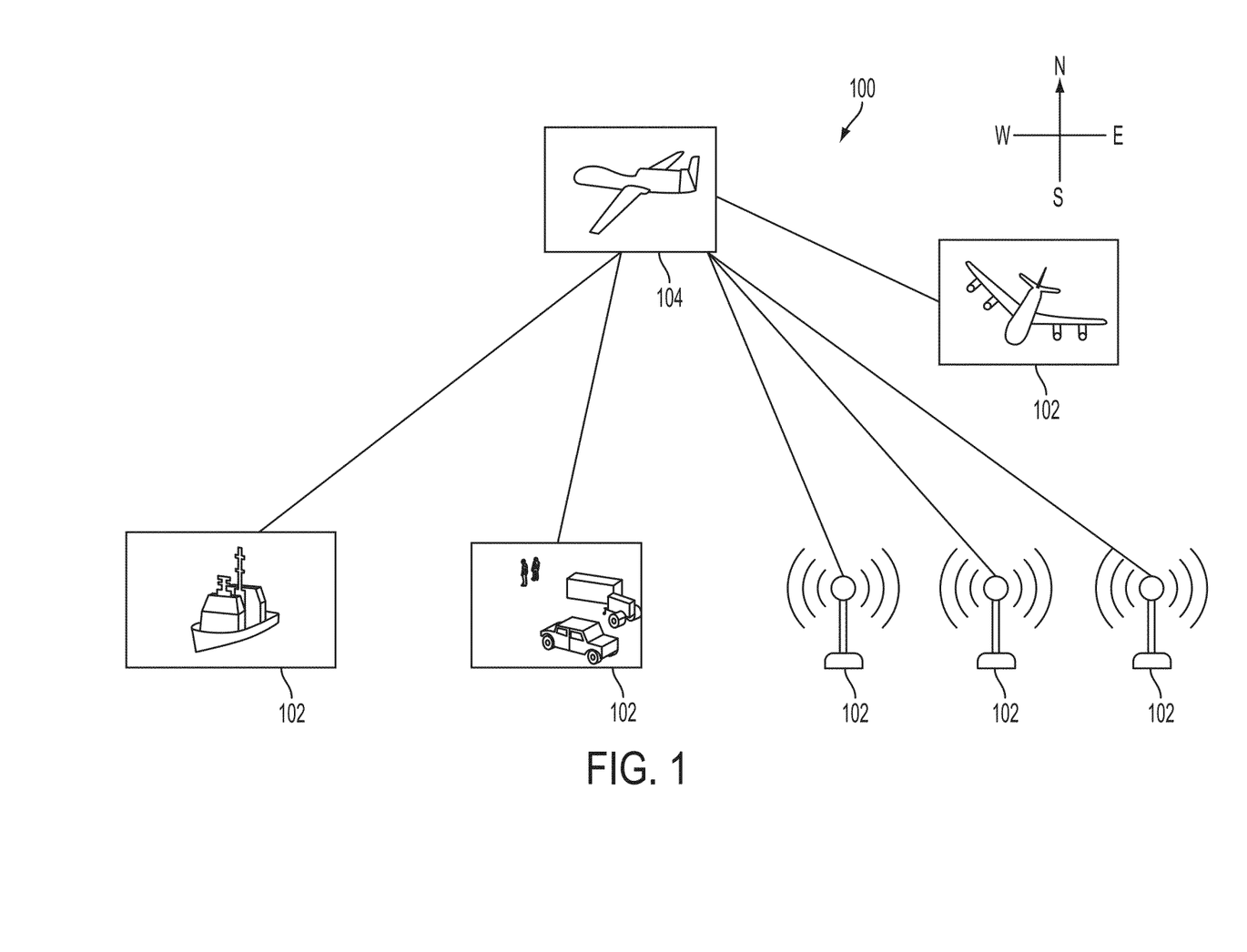
FIG. 1 illustrates an exemplary intelligent mobile transponder communication system including an intelligent mobile transponder configured to self-locate to an optimal position for relaying communication signals between a plurality of communication modules.

Referring to FIG. 1, an intelligent mobile transponder system 100 is illustrated according to an exemplary embodiment. The intelligent mobile transponder system 100 includes one or more communication modules 102, and an intelligent mobile transponder 104. The communication modules 102 include, but are not limited to, a base station, an aerial communication module, a mobile land-based communication module, and a mobile communication module capable of being carried by a human.

The intelligent mobile transponder 104 is configured to travel along one or more travel patterns or routes of a traveling zone. The intelligent mobile transponder 104 includes, but is not limited to, an unmanned aerial vehicle (UAV), an unmanned land vehicle (ULV) an unmanned naval vehicle (UNV), a steerable lighter than air (LTA) vehicle, and a robotic apparatus.

The intelligent mobile transponder 104 includes a signal detector, such as an antenna for example, to receive and/or transmit one or more communication signals output from a respective communication module 102. The intelligent mobile transponder 104 can process the communication signals according to a wide variety of non-limiting applications. For example, the intelligent mobile transponder 104 can receive a communication signal at one frequency and re-transmit the received communication signal at another frequency. According to another exemplary embodiment, the intelligent mobile transponder 104 can operate as a repeater that receives and re-transmits a communication signal generated from a communication module 102 at a common frequency.

The antenna can be constructed as a directional array antenna having one or more individual antennas. The antenna is configured to distinguish between directions of the incoming communication signals. In this manner, the antenna can determine the primary direction of one or more incoming signals. Although the intelligent mobile transponder 104 is described as processing communication signals such as, for example, radio frequency (RF) signals, it is appreciated that the intelligent mobile transponder 104 can be configured as an optical relay for relaying optical signals without departing from the scope of the invention.

According to an embodiment, the intelligent mobile transponder 104 is configured to provide secure and/or encrypted communications. The intelligent mobile transponder 104 can also include radio jamming capabilities as understood by one of ordinary skill in the art. In addition, the intelligent mobile transponder 104 can also distinguish between authorized incoming signals and unauthorized incoming signals, and continue to process the authorized signals while disregarding the unauthorized signals. The authorized signals can be determined according to various signal encryption/decryption methods. The flight pattern of the intelligent mobile transponder 104 can also be secure so as to make it difficult to determine the locations of one or more communications modules 102 generating the communication signals to be relayed.

In at least one embodiment, the intelligent mobile transponder 104 is provided as UAV that includes the various modules and systems described above. The UAV can be provided, for example, as a Predator type drone or Global Hawk type. The drone UAV is powered, for example, by one or more propellers or may be jet driven, and can be navigated by autonomous intelligence. In one embodiment, the drone UAV is controlled remotely by a user where the signal characteristics of one or more incoming signals are conveyed to an operator.

In another exemplary embodiment, the intelligent mobile transponder 104 is installed on a watercraft. The mobile transponder 104 can be located between a vessel located far off-shore and personnel located on land. Accordingly, the vessel can maintain a safer location away from the shoreline, while the mobile transponder 104 is located closer to the shoreline to relay communication signals.

In another exemplary embodiment, the intelligent mobile transponder 104 is configured as a repeater, which is disposed on a robotic vehicle. The robotic vehicle can travel freely to extend "Wi-Fi" communications between the base station and users with smart phones or laptops.

In another exemplary embodiment, the intelligent mobile transponder 104 can also be disposed on a robotic vehicle and then self-locate to extend communications between multiple teams performing ground maneuvers (i.e., search, rescue, defensive, or offensive) and a command location.

Figure 2A:
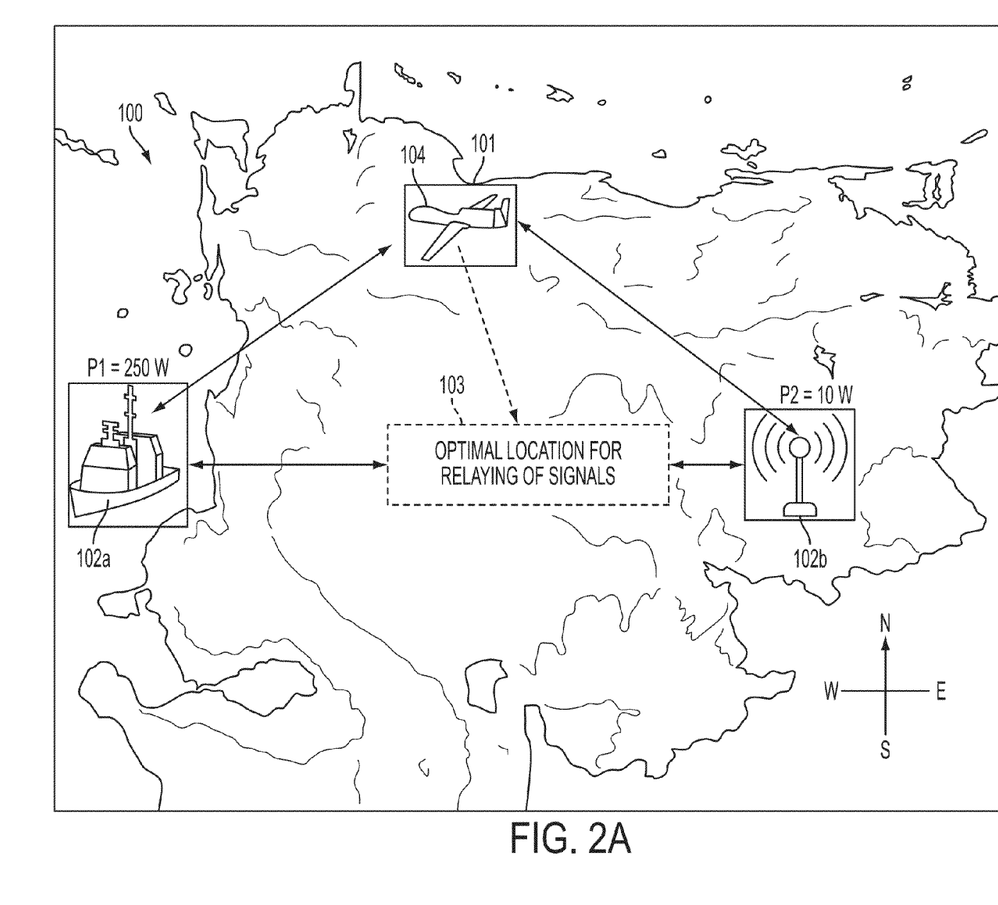
FIG. 2A illustrates an intelligent mobile transponder located at an initial position while receiving first and second communication signals from respective communication modules according to an exemplary embodiment.
Figure 2B:
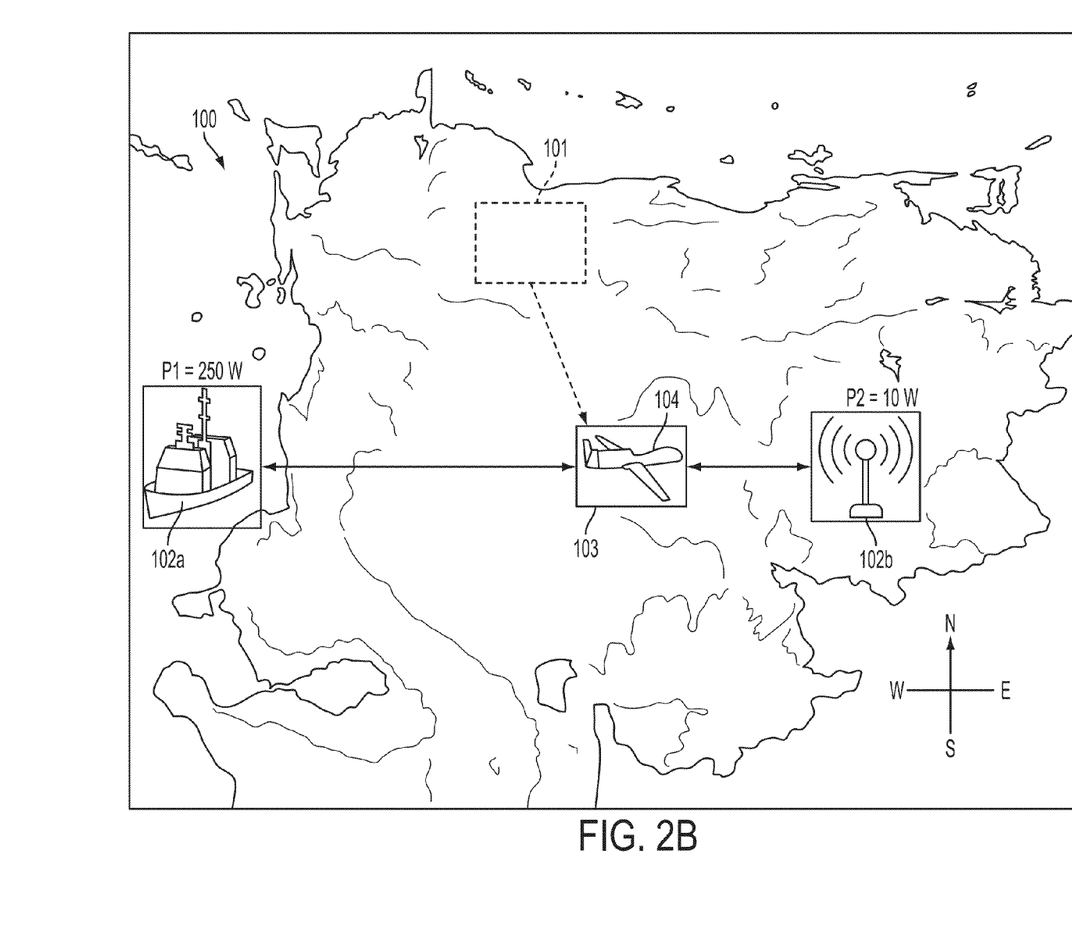
FIG. 2B illustrates the intelligent mobile transponder of FIG. 2A after self-locating to an optimal position for relaying the communication signals in response to comparing the signal characteristics and directions of the first and second communication signals.

Referring to FIGS. 2A and 2B, an intelligent mobile transponder 104 that automatically self-locates to an optimal location 103 to relay communications between a first communication module 102a and a second communication module 102b is illustrated according to an exemplary embodiment. Although two communication modules 102a and 102b are illustrated, it is appreciate that the intelligent mobile transponder 104 can communication with more than two communication modules. In FIG. 2A, the intelligent mobile transponder 104 is shown at an initial position 101 when it receives a first incoming communication signal from a first communication module 102a and a second incoming communication signal from a second communication module 102b. The first and second incoming communication signals from the first and second communication modules 102a/102b include, for example, RF signals. The signal characteristics include, for example, a power level of the respective communication signal.

According to a non-limiting example shown in FIG. 2A, the intelligent mobile transponder 104 determines that the first incoming communication signal has a power level of 250 Watts (W) and the second incoming RF signal has a power level of 10 W. The intelligent mobile transponder 104 also determines that the first communication signal originated from a south westerly direction, for example, while the second communication signal originated from a south easterly direction, for example. The intelligent mobile transponder 104 is configured to compare the power levels of the first and second communication signals to determine a weak communication module (e.g., 102b) that requires additional resources (e.g., power) to communicate with one or more of the remaining communication modules (e.g., 102a). In another embodiment, the difference between the first RF power level and the second RF power level is compared to a threshold value. If the difference exceeds the threshold value, first and second RF power levels are determined to be unbalanced. In addition, the intelligent mobile transponder 104 determines an optimal position 103 that enhances communication between the first communication module 102a and the second communication module 102b based on the primary direction of the first and second communication signals. The optimal position 103 includes, for example, a location between the first communication module 102a and the second communication module 102b, while also being closer to weak communication module 102b. In this manner the first and second RF power levels can be balanced with respect to one another.

Referring now to FIG. 2A, the intelligent mobile transponder 104 automatically changes travel direction in response to the comparison between the power levels of the communications signals and self-locates toward the optimal position 103. According to an embodiment, the intelligent mobile intelligent transponder 104 automatically self-locates to the optimal position 103 in response to determining that the second communication module 102b has a decreased power level with respect to the first communication module 102a, without requiring manual intervention or control. Once reaching the optimal position 103, the intelligent mobile transponder 104 can continue traveling toward the second communication module 102b having the decreased power level (e.g., the weak communication module 102b) to bolster the signal communication resources of the second communication module 102b. In this manner, the power levels of the first and second incoming communication signals are balanced with respect to one another. Once the power levels are balanced, the intelligent mobile transponder 104 can continuously compare the power levels of the first and second communication signals and automatically navigate itself to substantially maintain the optimal position 103 such that the first communication signal and the second communication signal remain balanced. Accordingly, at least one exemplary embodiments described above allows the intelligent mobile transponder 104 to self-relocate to provide additional bandwidth and/or power to the weak communication module 102b.

Figure 3:
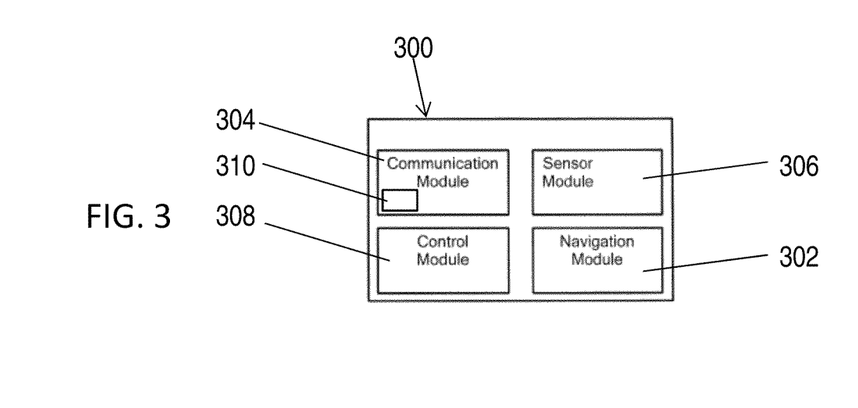
FIG. 3 is a block diagram illustrating a transponder module according to an exemplary embodiment.

Turning now to FIG. 3, a transponder module 300 included in an intelligent mobile transponder 104 is illustrated according to an exemplary embodiment. The transponder module 300 includes a navigation module 302, an on-board communication module 304, a sensor module 306, and a control module 308. The communication module 304 further includes a signal characteristic processing module 310, which is described in greater detail below. In at least one embodiment the transponder module 300 and the sub-module are electronic computer hardware modules. Each of the modules 302-310 included in the transponder 300 can electrically communicate with one another to share various calculations and data. A feedback loop is generated between one or more of the modules 302-310 included in the transponder module 300 to allow the intelligent mobile transponder 104 to continuously analyze the characteristics of the incoming signals and autonomously adjust the traveling position, i.e., self-locate to the optimal position 103, which best relays communication signals between the communication modules.

The navigation module 302 is configured to generate and control a navigation system of the intelligent mobile transponder 104. The navigation system allows the intelligent mobile transponder 104 to autonomously (i.e., without manual control) adjust the traveling path, i.e., self-locate. In at least one embodiment, the traveling pattern (i.e., route) is automatically adjusted. The navigation module 302 can also determine various parameters of the travel path of the intelligent mobile transponder 104 including, but not limited to, direction, speed, acceleration, altitude and heading. The navigation module 302 is further configured to define an operational flight zone contained within the area of the plurality of communication modules. In this manner, the flight zone defined by the plurality of communication modules acts as sub-zone within the operational flight zone. The operation flight zone, however, restricts the intelligent mobile transponder 104 from venturing into undesired flight zones, despite the existence of a more optimal position.

The on-board communication module 304 is configured to receive and/or transmit one or more communication signals. For example, the on-board communication module 304 can receive an incoming communication signal from a first communication module and re-transmit the communication signal to a second communication module. In this manner, the incoming communication can be relayed to enhance communication between the first and second communication modules.

The signal characteristic processing module 310 included with the on-board communication module 304 is configured to sense and characterize one or more the incoming communication signals as discussed in greater detail below. In an exemplary embodiment, the on-board communication module 304 enables the intelligent mobile transponder 104 to transmit and/or receive information with a remote site, satellite links, wireless links, etc. In addition, the intelligent mobile transponder 104 can communicate with aircraft, ships, land vehicles, base units, etc. It is understood that the intelligent mobile transponder 104 can communicate using any suitable channel.

In an exemplary embodiment, the on-board communication module 304 enables the intelligent mobile transponder 104 to transmit and/or receive information with a remote site. Satellite links, wireless links, etc. can communicate the information. The intelligent mobile transponder 104 can also relay an incoming RF signal from a first destination to a second destination located a distance away from the first destination.

The sensor module 306 includes a variety of sensors and equipment to obtain data, such as images, pressure, sound, humidity, height, altitude, audio/video, etc. According to an embodiment, the sensor module 306 is utilized to autonomously control the intelligent mobile transponder 104 to travel according to various desired parameters including, but not limited to, altitude, speed, acceleration, direction and location.

The control module 308 electrically communicates with the navigation module 302 to provide overall control of the intelligent mobile transponder 104. The on-board communication module 304 enables the intelligent mobile transponder 104 to communicate with one or more systems via wireless link, for example. In at least one embodiment, a ground system includes a navigational system. The navigation system can communicate parameters to the intelligent mobile transponder 104 via the on-board communication module 304 such that a travel path is autonomously controlled by the control module 308 of the intelligent mobile transponder 104. In an exemplary embodiment, a user can have access to information of the intelligent mobile transponder 104.

The control module 308 is also in electrical communication with the on-board communication module 304 to receive the signal characteristics and determine whether one or more of incoming communication signals are balanced with respect to one another. For example, the control module 308 compares the power levels of the first and second communication signals to determine a weak communication module (e.g., 102b) that requires additional resources (e.g., power) to communicate with one or more of the remaining communication modules (e.g., 102a). In another embodiment, the difference between the first RF power level and the second RF power level is compared to a threshold value. If the difference exceeds the threshold value, the first and second RF power levels are determined to be unbalanced.

The control module 308 also receives the directional information of the incoming communication signals from the on-board communication module 304. Based on the comparison of RF power levels and the directional information of the incoming communication signals, the control module 308 determines the optimal position 103. In response to determining the optimal position 103, the control module 308 generates a control signal that commands the navigation unit 302 to locate the intelligent mobile transponder 104 to the optimal position 103. In this manner, the intelligent mobile transponder 104 automatically self-locates to the optimal position 103 without requiring manual intervention or control.

Figure 4:
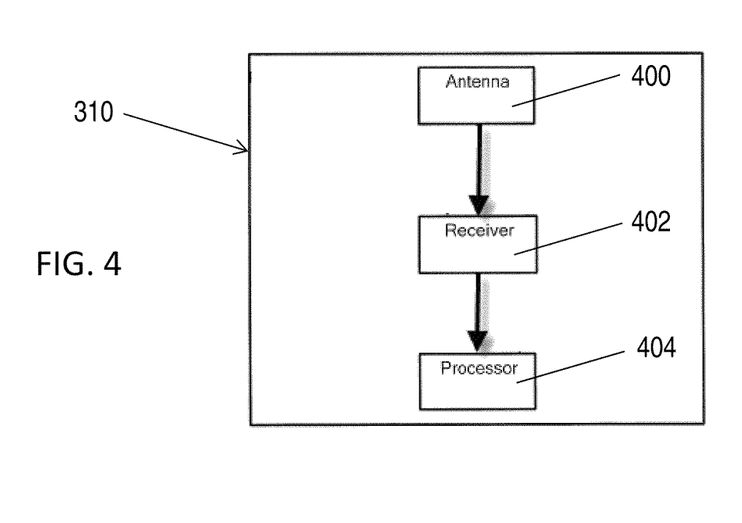
FIG. 4 is a block diagram illustrating a signal characteristic processing module according to an exemplary embodiment.

Referring now to FIG. 4, a block diagram illustrating a signal processing module 310 included in the communication module 304 is illustrated according to an exemplary embodiment. Although the signal processing module 310 is illustrated, it is appreciated that the signal processing module 310 can be included in another module such as, for example the sensor module 306, without departing from the scope of the invention. The signal processing module 310 includes an antenna module 400, a receiver module 402 and a processor module 404.

The antenna module 400 includes one or more antennas to receive and/or transmit energy to and/or from the receive module 402. The antenna module 400 can include a directional or phased array antenna that is configured to detect one or more signals in all directions with respect to the intelligent mobile transponder 104, and at all times. According to an embodiment, the antenna module 400 includes a directional antenna array comprising a plurality of antenna elements configured to sense a primary direction of one or more incoming communication signals.

The processor module 406 processes one or more incoming communication signals received by the antenna module 406. According to an embodiment, the processor module 406 is configured to generate one or more vectors to be analyzed. The processor module 406 is also configured to determine various signal characteristics including, but not limited to, RF signature, signal quality, signal power level, signal frequency, and/or signal direction. According to an embodiment, a root-mean-square algorithm is executed to determine one or more signal characteristics such as the RF power level, for example, of one or more incoming signals. The processor module 406 can also determine various other suitable signal frequencies and signal processing techniques as understood by one of ordinary skill in the art. In addition, (for example when the transponder is acting as a supplement or alternative to a satellite communication (SATCOM) transponder) the processor module 406 can delay processing one or more signals a predetermined amount of time (e.g., to simulate the time a signal may normally take to travel to the satellite and back) The delay can range, for example, from approximately 200 milliseconds (ms) to approximately 800 ms.

Figure 5:
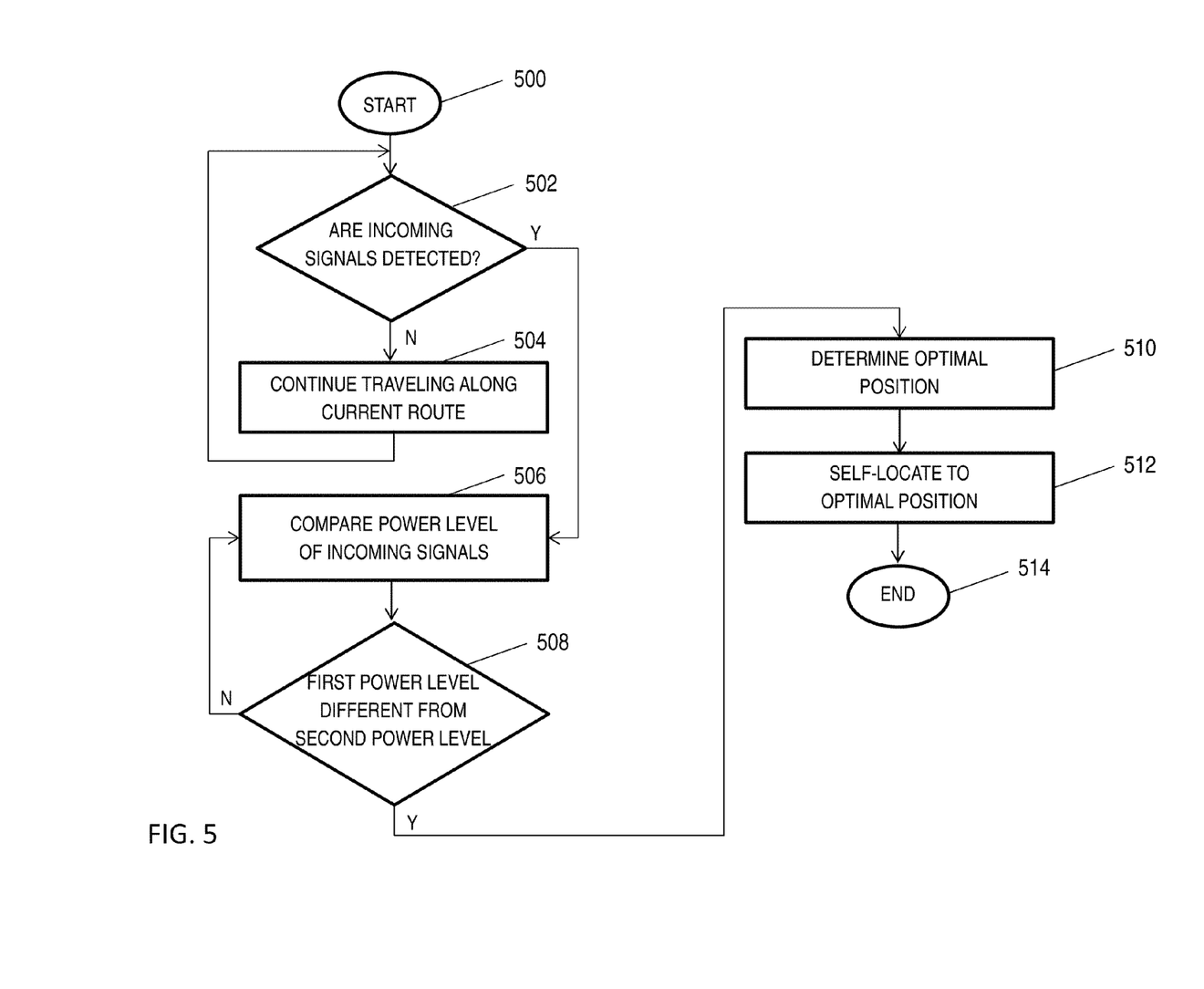
FIG. 5 is a flow diagram illustrating a method of self-locating a mobile transponder to an optimal position based on signal characteristics and directions of received communication signals according to an exemplary embodiment.

Referring now to FIG. 5, a flow diagram illustrates a method of self-locating a mobile transponder to an optimal position based on signal characteristics and directions of received communication signals according to an exemplary embodiment. The method begins at operation 500 and proceeds to operation 502 to determine whether incoming communication signals are detected. If incoming communication signals are not detected, the intelligent mobile transponder maintains the initial position or traveling route at operation 504, and the method returns to operation 502 to continue monitoring for incoming communication signals. If, however, incoming communication signals are detected, the signal characteristics of the incoming signals are compared to one another. According to at least one embodiment, a first RF power level of a first incoming communication signal is compared to a second RF power level of a second incoming communication signal at operation 508. At operation 510, an optimal position for enhancing communication between communication modules is determined. The optimal position is determined based on, for example, the comparison of the RF power levels and the primary directions of the incoming communication signals. At operation 512, the intelligent mobile transponder autonomously self-locates to the optimal position and the method ends at operation 514. According to another embodiment, the method returns to operation 506 after self-locating to the optimal position at operation 512 and continues to compare the RF power levels. In this manner, the intelligent mobile transponder can remain within the optimal location or adjust the optimal position if the RF levels of the communication modules change.

Figure 6:
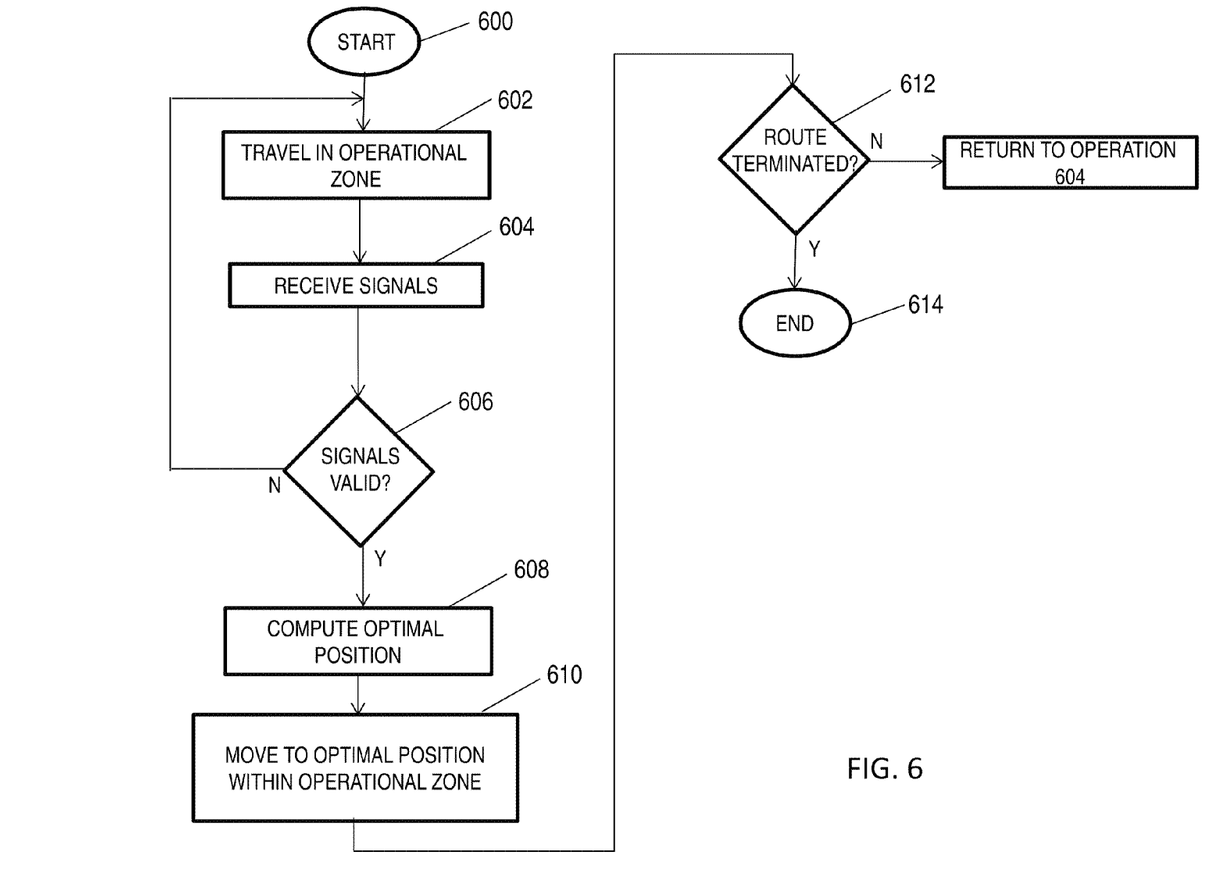
FIG. 6 is a flow diagram illustrating a method of self-locating a mobile transponder to an optimal position based on signal characteristics and directions of received communication signals according to another exemplary embodiment.

Referring now to FIG. 6, a flow diagram illustrates a method of controlling an intelligent mobile transponder according to an exemplary embodiment. The method begins at operation 600, and at operation 602 the intelligent mobile transponder is determined to be traveling in an initial position. At operation 604, one or more signals are received by the intelligent mobile transponder. At operation 606, the intelligent mobile transponder determines whether one or more of the received signals are valid. If one or more of the received signals are invalid, the intelligent mobile transponder disregards the invalid signals and returns to operation 602. If, however, one or more of the signals are determined to be valid at operation 606, the intelligent mobile transponder computes an optimal position based on the valid signals at operation 608. The optimal position is based on the characteristics and directions of the received signals, for example. It is appreciated that if the intelligent mobile transponder receives a plurality of signals, some signals may be determined to invalid, while other signals may be determined to be valid. In this manner, the intelligent mobile transponder may disregard the invalid signals, while determining an optimal position based on the valid signals.

Turning now to operation 610, the intelligent mobile transponder self-locates to the optimal position. The intelligent mobile transponder can maintain the new travelling route that includes the optimal position in order to relay signals between a plurality of communication modules. At operation 612, the intelligent mobile transponder determines whether the travelling route is terminated. If the travelling route is not terminated, method returns to operation 604 and continues receiving signals. If the method is terminated, however, the method ends at operation 614. It is appreciated that the intelligent mobile transponder may determine whether the travelling route has terminated following any of the operations 602-612 described above.

As described above, the intelligent mobile transponder 104 is configured to be autonomous with a system that distinguishes between one or more incoming signals, such as an RF signal. In this manner, the intelligent mobile transponder 104 automatically adjusts a traveling path based on the signal characteristics of the incoming signals and the directions of the incoming communication signals. In at least one embodiment, one or more signal characteristics of a first incoming communication signal are compared to one or more signal characteristics of a second incoming communication signal. Based on the comparison, the intelligent mobile transponder 104 automatically adjusts the traveling path, i.e., self-adjusts, to improve the signal communication of the one or more incoming signals. In at least one embodiment, the signal communication is improved by adjusting the traveling path to increase the signal strength of one or more received incoming signals. In another embodiment, the signal communication is improved by balancing the signal strength among a plurality of incoming signals. For example, the traveling path is adjusted by autonomously controlling the intelligent mobile transponder 104 to self-locate to the optimal position 103, and can continue traveling in the direction of an incoming signal having the lowest power signal among the incoming communication signals. In this manner, communication resources of one or more weak communication modules can be bolstered such that communication between a plurality of communication modules can be enhanced.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An intelligent mobile transponder communication system, comprising:
   an intelligent mobile transponder configured to:
      receive a first communication signal from at least one first communication module, the at least one first communication module configured to transmit a first communication signal in a first plurality of directions, the first communication signal having at least one first signal characteristic;
      receive second communication signal from at least one second communication module, the at least one second communication module configured to transmit a second communication signal in a second plurality of directions, the second communication signal having at least one second signal characteristic different from the at least one first signal characteristic; and
      to determine an optimal position with respect to the first and second directions based on a comparison between the at least one first signal characteristic and the at least one second signal characteristic, wherein the intelligent mobile transponder automatically self-locates to the optimal position to relay the first and second communication signals to the at least one first communication module and the at least one and second communication module.

2. The intelligent transponder communication system of claim 1, wherein the first signal characteristic is a first RF power level and the second signal characteristic is a second RF power level that is less than the first RF power level.

3. The intelligent transponder communication system of claim 2, wherein the intelligent mobile transponder locates closer to the at least one second communication module such that the power levels of the first and second communication signals are balanced with respect to one another.

4. The intelligent transponder communication system of claim 3, wherein the intelligent mobile transponder continuously compares the first and second RF power levels and automatically controls navigation to maintain the optimal position such that the signals remain balanced.

5. The intelligent transponder communication system of claim 4, wherein the intelligent mobile transponder includes a directional antenna configured to determine a primary direction of the first and second communication signals with respect to the intelligent mobile transponder.

6. The intelligent transponder communication system of claim 5, wherein the intelligent mobile transponder is an unmanned vehicle.

7. The intelligent transponder communication system of claim 6, wherein the intelligent mobile transponder determines the RF power levels according to a root-mean-square algorithm.

8. A transponder module included in an intelligent mobile transponder, the transponder module comprising:
   an on-board communication module configured to receive a first incoming communication signal from at least one first communication module and a second incoming communication signal from at least one second communication module;
   a signal characteristic processing module in electrical communication with the on-board communication module, the signal characteristic processing module configured to determine a first primary direction of the first incoming communication signal and a second primary direction of the second incoming communication signal, and configured to determine at least one first signal characteristic of the first incoming communication signal and at least one second signal characteristic of the second incoming communication signal; and
   a control module in electrical communication with the signal characteristic processing module, the control module configured to determine an optimal position of the intelligent mobile transponder based on the first and second primary directions and the at least one first and second signal characteristics.

9. The transponder module of claim 8, wherein the control module compares the at least one first signal characteristic with the at least one second signal characteristic, and determines the optimal position based on the comparison.

10. The transponder module of claim 9, further comprising a navigation module configured to control the position of the intelligent mobile transponder, wherein the control module commands the navigation module to position the intelligent mobile transponder at the optimal position.

11. The transponder module of claim 10, wherein the signal characteristic processing module determines a first RF power level of the first incoming communication signal and a second RF power level of the second incoming communication signal different from the first RF power level.

12. The transponder module of claim 11, wherein the signal characteristic processing module determines the first RF power level and second RF power level based on a root-means-square algorithm.

13. The transponder module of claim 12, wherein the signal characteristic processing module includes a directional antenna configured to sense the first primary direction of the first incoming communication signal and the second primary direction of the second incoming communication signal.

14. A method of relaying communication signals via an intelligent mobile transponder, the method comprising:
receiving from at least one first communication module a first incoming communication signal having at least one first signal characteristic received from at least one first direction;
receiving from at least one second communication module a second incoming communication signal having at least one second signal characteristic received from at least one second direction that is different from the first direction;
determining an optimal position with respect to the first and second directions based on a comparison between the at least one first signal characteristic and the at least one second signal characteristic; and
automatically locating the intelligent mobile transponder to the optimal position to relay the first and second communication signals to the at least one first second communication module and the at least one second communication module.

15. The method of claim 14, wherein the first signal characteristic is a first RF power level and the second signal characteristic is a second RF power level that is less than the first RF power level.

16. The method of claim 15, further comprising balancing the RF power levels of the first and second communication signals with respect to one another in response to locating intelligent mobile transponder closer to the second communication module.

17. The method of claim 16, further comprising continuously comparing the first and second RF power levels and automatically navigating the intelligent mobile transponder to maintain the optimal position such that the first and second communication signals remain balanced.

18. The method of claim 17, further comprising determining a primary direction of the first and second communication signals with respect to the intelligent mobile transponder.

19. The method of claim 18, wherein the intelligent mobile transponder is an unmanned vehicle.

20. The method of claim 19, further comprising determining the RF power levels according to a root-mean-square algorithm.

* * * * *